(12) United States Patent  
Fujiwara et al.

(10) Patent No.: US 7,672,362 B2
(45) Date of Patent: Mar. 2, 2010

(54) COMMUNICATIONS APPARATUS, COMMUNICATIONS SYSTEM, AND COMMUNICATIONS METHOD

(75) Inventors: Ryosuke Fujiwara, Tokyo (JP); Kenichi Mizugaki, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 779 days.

(21) Appl. No.: 11/003,511

(22) Filed: Dec. 6, 2004

(65) Prior Publication Data

US 2005/0152438 A1 Jul. 14, 2005

(30) Foreign Application Priority Data

Jan. 13, 2004 (JP) ............................. 2004-005026

(51) Int. Cl.
*H04B 1/38* (2006.01)
(52) U.S. Cl. ........................ 375/219; 375/220; 375/222; 375/227; 375/340; 375/342; 375/345; 375/348
(58) Field of Classification Search ................. 375/220, 375/219, 222, 227, 340, 342, 345, 348; 455/216, 455/522, 63.1
See application file for complete search history.

(56) References Cited

U.S. PATENT DOCUMENTS

| 6,359,934 B1 | 3/2002 | Yoshida |
| 6,539,213 B1 | 3/2003 | Richards et al. |
| 6,876,641 B2 * | 4/2005 | Banister .................... 370/335 |
| 2003/0194979 A1 * | 10/2003 | Richards et al. ............. 455/216 |
| 2004/0136468 A1 * | 7/2004 | Suzuki ........................ 375/295 |
| 2004/0179577 A1 * | 9/2004 | Kim ........................... 375/130 |
| 2004/0219897 A1 | 11/2004 | Choi |

FOREIGN PATENT DOCUMENTS

| JP | 11-275164 | 3/1998 |
| JP | 2003-051761 | 8/2001 |
| JP | 2004-336764 | 4/2004 |

OTHER PUBLICATIONS

Moe Z. Win et al., "Impulse Radio: How it Works", IEEE Communications Letters, vol. 2, No. 2, Feb. 1998, pp. 36-38.
JPO Notification of Reasons for Refusal dated Mar. 25, 2008, in English.

* cited by examiner

*Primary Examiner*—Shuwang Liu
*Assistant Examiner*—Kabir A Timory
(74) *Attorney, Agent, or Firm*—Stites & Harbison PLLC; Juan Carlos A. Marquez, Esq.

(57) ABSTRACT

A communications apparatus which ensures a predetermined communication quality even when an external environment changes dynamically, and enhances a throughput for overall system, thereby achieving favorable transmission efficiency. A communications apparatus having a receiver and a transmitter and carries out sending/receiving by use of a pulse train is provided with a communication environment measuring section to measure a communication status based on an output from the receiver. The transmitter is configured such that it transmits a transmission signal, in which the transmission rate of data to be transmitted and the pulse energy have been controlled in association with each other, according to a result of the measurement.

11 Claims, 13 Drawing Sheets

COMMUNICATIONS APPARATUS, COMMUNICATIONS SYSTEM, AND COMMUNICATIONS METHOD

CLAIM OF PRIORITY

The present application claims priority from Japanese application JP 2004-005026 filed on Jan. 13, 2004, the content of which is hereby incorporated by reference into this application.

FIELD OF THE INVENTION

The present invention relates to a communications apparatus, communications system, and communications method, which use a pulse train as a transmission signal.

BACKGROUND OF THE INVENTION

In an impulse radio communication system, for example, communications are generally carried out by use of a pulse signal. In "Impulse radio: how it works", Win, M. Z.; Scholtz, R. A, IEEE Communications Letters, February 1998, Volume: 2 Issue: 2 (hereinafter, referred to as "Non-patent document 1"), there is disclosed a communications system of PPM (Pulse Position Modulation) method, which modulates a Gaussian Monocycle Pulse at a pulse position. Such communications method as described above, which uses a pulse train, carries out transmission of information by sending and receiving intermittent energy signals, unlike an ordinary signal transmission using a continuous wave.

When a pulse constituting the pulse train has an extremely narrow pulse width, a signal spectrum thereof may cause a larger frequency band, thereby dispersing energy of signal, compared to the ordinary communications using the continuous wave. Consequently, the signal energy in each frequency becomes very minute, and communications can be carried out without interference with other communications system. Therefore, it is possible to share the frequency band.

However, assuming a case of wireless communications, for example, external environment around wireless equipment is constantly changing due to movement of the communications apparatus, shifting of an object and/or a person, and the like. Therefore, there has been a problem that a communication quality is forced to be varied in accordance with the external environmental change.

In order to ensure a good communication quality even in the case where the communication environment is deteriorated, there is disclosed a method which measures a communication environment and based on the result thereof it controls a transmission power, as disclosed in the Japanese unexamined patent publication No. 2003-51761 (hereinafter, referred to as "Patent document 1") and the specification in U.S. Pat. No. 6,539,213 (hereinafter, referred to as "Patent document 2").

SUMMARY OF THE INVENTION

In order to minimize interferences affecting another communications apparatus, however, an upper limit has to be set in transmittable energy, causing problems such that a signal transmission distance is restricted, or communication failure may occur due to a deterioration of the external environment. The power control method as disclosed in the Patent document 1 and the Patent document 2, does not consider this upper limit of the transmission energy, and thus it is not possible to expect a drastic improvement in communication quality. Furthermore, under such a deteriorated external environment, if the number of data retransmission is increased due to communication failures and the like, the number of times and a period of time for transmission by a transmitter are also increased. Therefore, there may be a problem of upsurge in power consumption.

In view of the problems above, an object of the present invention is to provide a communications apparatus, communications system, and communications method, which ensure a communication quality against a change in the external environment, and enhance a throughput for overall system, thereby achieving favorable transmission efficiency.

Some of typical examples of the present invention to be disclosed will be described as the following. That is, a communications apparatus relating to the present invention is an apparatus which carries out information transmission by use of a pulse train, comprising a receiver which receives a predetermined signal, a communication environment measuring means which measures a communication environment status based on a received signal from the receiver, and a transmitter having a control means which performs a transmission rate control of the pulse train and a single pulse transmission energy control based on a result of measurement from the communication environment measuring means, wherein, the transmitter transmits the pulse train which has been controlled by the control means.

In the communications apparatus above, it is preferable that the control means performs the transmission rate control of the pulse train in association with the single pulse transmission energy control, so that an average transmission energy is set to be equal to or less than a predetermined value. Here, the predetermined value of the average transmission energy is generally a value stipulated by the Radio Law or a communication standard in each country.

Furthermore, the communications system according to the present invention comprises a first communications apparatus and at least one second communications apparatus, the communications system carrying out communications through sending/receiving a pulse train, wherein the first communications apparatus includes a first receiver which receives the pulse train, a communication environment measuring means which measures a communication environment status based on the received signal from the first receiver, a control signal generating means which generates a control signal based on a result of measurement in the communication environment measuring means, and a first transmitter which transmits the control signal to the second communications apparatus, and the second communications apparatus includes a second receiver which receives the control signal transmitted from the first communications apparatus, and a second transmitter which is provided with a control means which performs a transmission rate control of the pulse train and a single pulse transmission energy control according to the control signal received from the second receiver, and the second transmitter transmits the pulse train which has been controlled by the control means.

A communications method relating to the present invention is a method which carries out sending/receiving by use of a pulse train, comprises a receiving step which receives a predetermined signal, a measuring step which measures a communication environment based on the predetermined signal received by the receiving step, a control step which performs a transmission rate control of the pulse train and a single pulse transmission energy control based on a result of measurement in the measuring step, and a transmitting step which transmits the pulse train thus controlled.

Furthermore, the communications method relating to the present invention is a method of a communications system comprising a first communications apparatus and at least one second communications apparatus, and carrying out communications by sending/receiving a pulse train, wherein, the first communications apparatus includes a first receiving step which receives a predetermined signal, a measuring step which measures a communication environment based on the received signal, a control signal generating step which generates a control signal based on a result of measurement in the measuring step, and a first transmission step which transmits the control signal to the second communications apparatus, and the second communications apparatus includes a second receiving step which receives the control signal transmitted from the first communications apparatus, a control step which performs the transmission rate control of the pulse train and the single pulse transmission energy control according to the control signal received in the second receiving step, and a second transmitting step which transmits the pulse train thus controlled in the control step to the first communications apparatus.

In any of the above communications methods, it is preferable to perform the transmission rate control of the pulse train in association with the single pulse transmission energy control, so that average transmission energy is equal to or less than a predetermined value.

In any of the above communications methods, it is sufficient for the measuring step to measure at least one of the followings as to the signal received in the receiving step: a received power, a signal-to-noise ratio, an error rate of received data, and a background noise power.

Even if an external communication environment is dynamically changed, it is possible to enlarge a pulse interval between pulse trains according to the change in the communication environment, thereby increasing energy as to one pulse and ensuring a favorable communication quality without changing the average transmission power. In addition, if the communication environment is favorable, it is possible to make the transmission rate as higher as possible, thereby enhancing overall system efficiency.

DETAILED DESCRIPTION OF THE PREFERRED EMBODIMENTS

Preferred embodiments of the present invention will be described in detail with reference to the accompanying drawings.

First Embodiment

Figure 1:
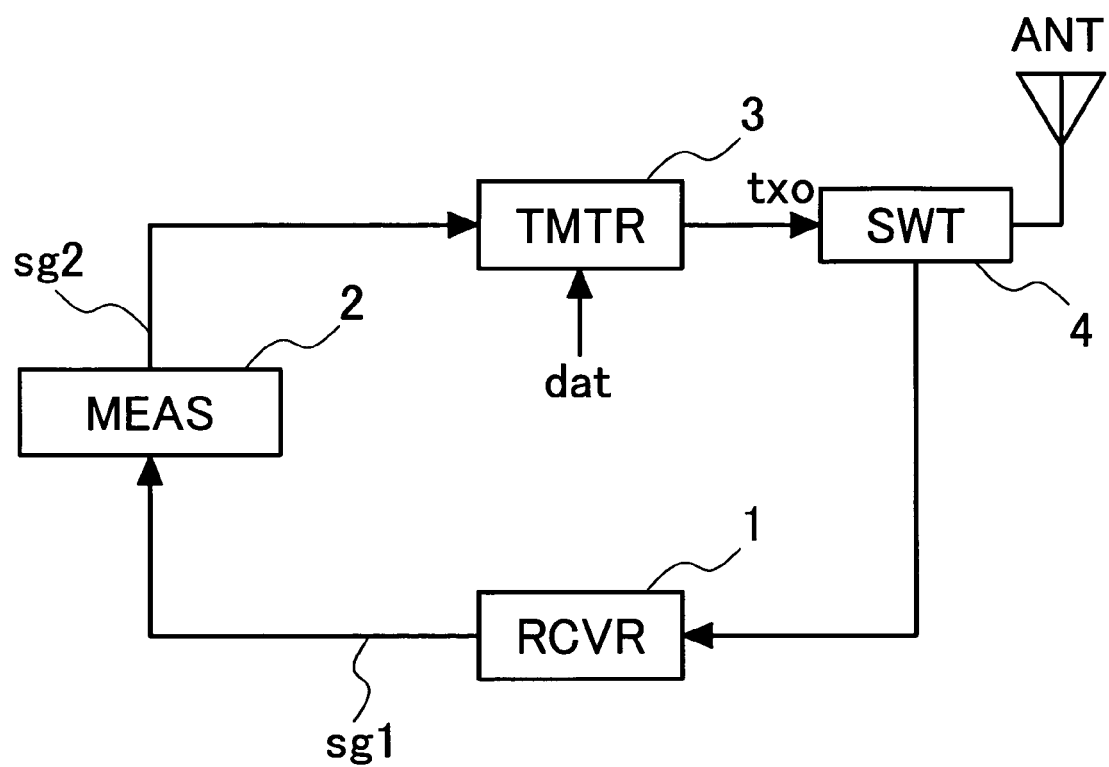
FIG. 1 is a block diagram showing a configuration of an example in which the present invention is applied to a communications apparatus according to the first embodiment.

FIG. 1 shows a configuration of the first embodiment in which the present invention is applied to a communications apparatus. The communications apparatus of the present embodiment comprises a receiver (RCVR) 1 which receives a pulse train via an antenna (ANT), a communication environment measuring section (MEAS) 2 which measures a communication status based on an output signal sg1 from the receiver 1, a transmitter (TMTR) 3 which receives a result of the measurement sg2 from the communication environment measuring section 2, so as to control a transmission rate of a transmission pulse train and transmission energy of a single pulse of the data dat, which is to be transmitted, and to output a transmission signal txo, and a switch (SWT) 4 which allows the receiver 1 and the transmitter 3 to share the antenna.

Figure 2:
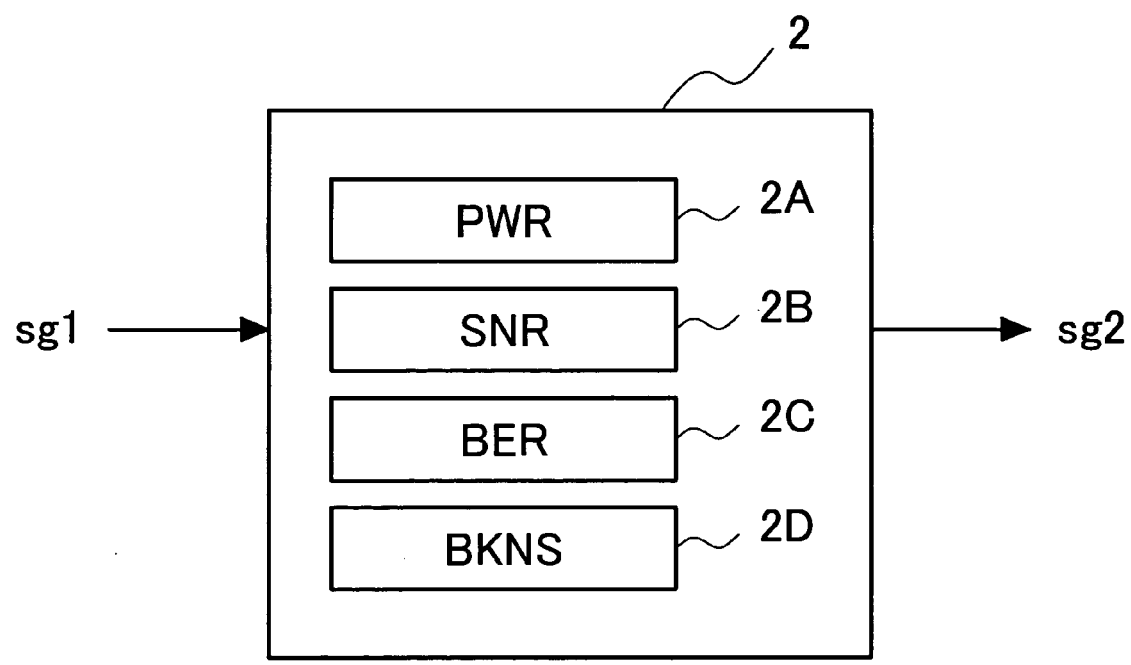
FIG. 2 is a block diagram showing a configuration of an example of the communication environment measuring section (MEAS) as shown in FIG. 1.

FIG. 2 is a block diagram showing a configuration example of the communication environment measuring section 2, and it is provided with at least one of the followings; signal power measuring section (PWR) 2A, signal-to-noise ratio measuring section (SNR) 2B, error rate measuring section (BER) 2C, and background noise measuring section (BKNS) 2D.

In the present embodiment, a specific explanation will be given, taking the impulse radio communication system as an example. The impulse radio communication system is a method for transmitting information via an impulse train which uses an impulse waveform as a pulse. In addition, time hopping is applied in order to establish a multi-user connection. Here, the "time hopping" means that transmission slot of a pulse is allocated in accordance with a pseudo-random code sequence, which is uniquely allocated to a user. As a modulation method, we have PPM method, Bi-Phase method which changes the phase of a monopulse by ±180 degrees, and Pulse Amplitude Modulation (PAM) method, and any one of those method is applicable. In here, the Bi-Phase method is employed.

The scope to which the present invention is applicable is not limited to the communication method as described above, and it is applicable to all the methods which carry out information transmission by use of intermittent energy. For example, the present invention is also applicable to a signal string, which is obtained by modulating a continuous wave with a pulse train, through BPSK (Bi-Phase Shift Keying), QPSK (Quadrature Phase Shift Keying), and the like. Furthermore, there is a restriction neither in a waveform of the pulse train nor in a modulation method.

Figure 3:
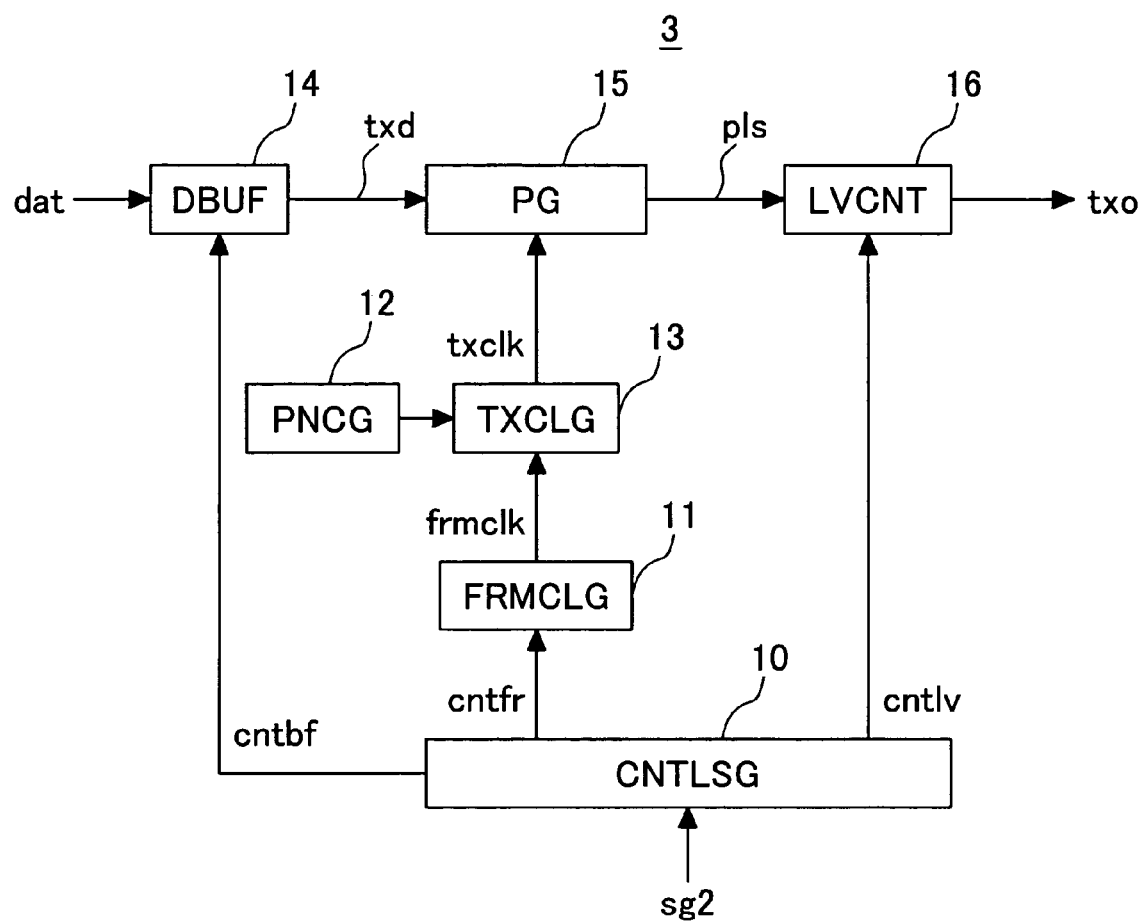
FIG. 3 is a block diagram showing a configuration of an example of the transmitter (TMTR) as shown in FIG. 1.

FIG. 3 is a block diagram showing a configuration example of the transmitter (TMTR) 3 as shown in FIG. 1. The transmitter 3 comprises a control signal generator (CNTLSG) 10, a frame clock generator (FRMCLG) 11, a pseudo-random code generator(PNCG) 12, a transmission timing clock generator (TXCLG) 13, a data buffer (DBUF) 14, a pulse generator (PG) 15, and a level controller (LVCNT) 16.

Figure 4:
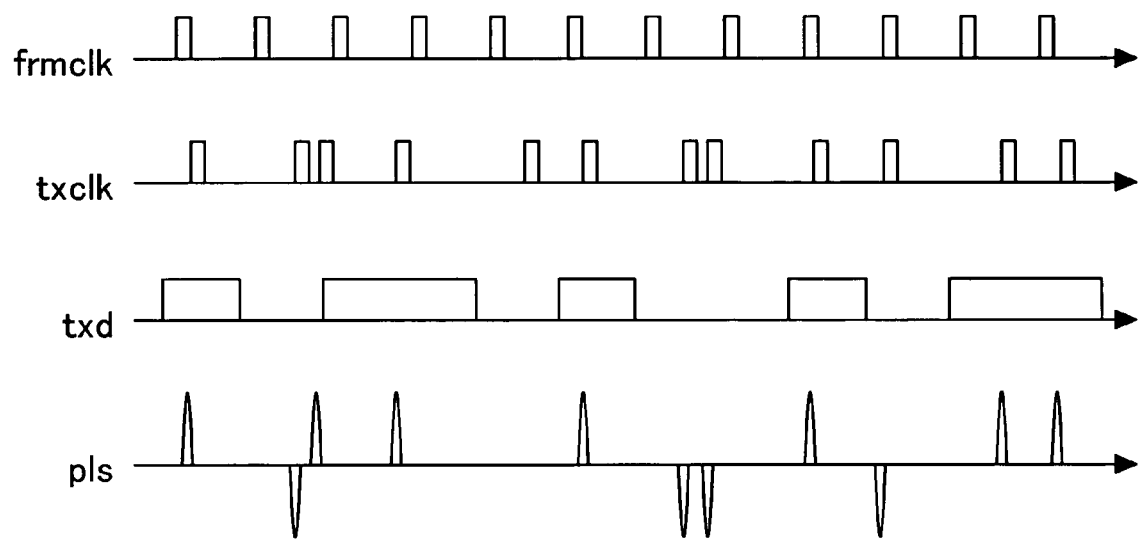
FIG. 4 is a diagram showing examples of waveforms as to each part of the transmitter as shown in FIG. 3.

FIG. 4 shows examples of waveforms of the frame clock frmclk, the transmission timing clock txclk, data txd outputted from the data buffer 14, and output pls from the pulse generator 15. By use of those waveforms, operations of the transmitter 3 will be described.

The frame clock generator 11 generates a frame clock frmclk which defines a frame interval of a pulse train. The pseudo-random code generator 12 generates a sequence which decides an amount of time hopping, and the transmission timing clock generator 13 generates a transmission timing clock txclk from the above time hopping sequence and the above frame clock frmclk. The data buffer 14 temporarily accumulates and outputs data to be transmitted. The pulse generator 15 generates a pulse waveform which has been modulated by the data txd outputted from the data buffer 14 at the timing of the transmission timing clock txclk, and outputs a pulse train pls. The modulation reverses the polarity by "1" and "0" of the transmission data. The level controller 16 controls a level of a single pulse of the pulse train pls, and transmits thus controlled signal txo.

Based on the result of the measurement sg2 outputted from the communication environment measuring section 2, the control signal generator 10 generates a control signal cntfr for controlling an oscillation period of the frame clock generator 11 and a control signal cntlv for controlling the level controller 16. This control signal generator 10 is also provided with a memory function and is capable of storing a control value. Data output timing of the data buffer 14 is controlled in accordance with the control signal cntbf, which is generated in the control signal generator 10.

Figure 5A:
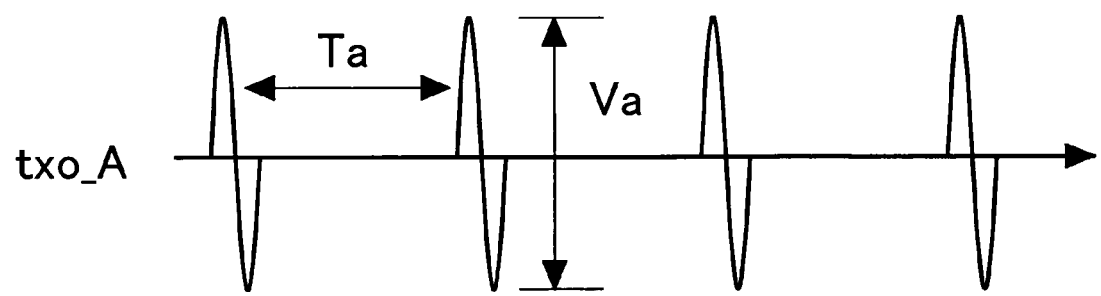
FIG. 5A and FIG. 5B are diagrams showing examples of voltage waveforms which are outputted from the level controller (LVCNT) as shown in FIG. 3.
Figure 5B:
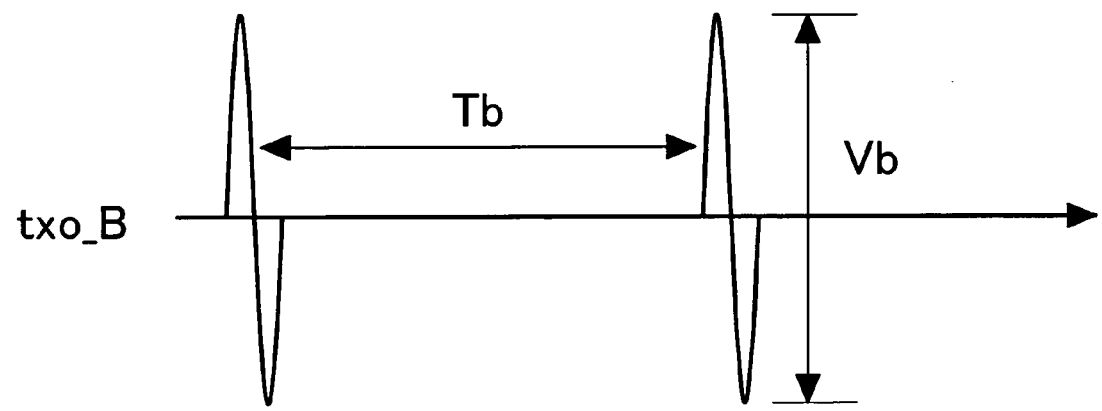

FIGS. 5A and 5B are diagrams showing examples of voltage waveforms of the transmission pulse train txo which are outputted from the level controller 16. Referring to the diagrams, an example for controlling the pulse train will be explained. Va or Vb indicates an amplitude of the pulse, and Ta or Tb indicates an interval between the pulses. However, in the system to which the time hopping has been applied as described above, the interval between the pulses is set to an average value.

Here, it is assumed that energy for each single pulse in FIG. 5A and FIG. 5B is Sa and Sb. Sa and Sb are respectively proportional to the square of the pulse amplitudes Va and Vb. Here, characteristic impedance at the antenna edge decides the proportionality factor. For example, when the communication environment is favorable, the transmission rate is made higher as indicated by txo_A and the pulse amplitude is decreased, thereby reducing the energy of a single pulse. On the other hand, when the communication environment is unfavorable, the transmission rate is controlled to be made lower as indicated by txo_B, and the pulse amplitude is increased, thereby enlarging the energy of a single pulse. At this timing, average transmission energy is controlled to be equal to or less than a predetermined value, that is, within a range not more than the predetermined average value. Preferably, the average transmission energy is to be a constant value. Here, the predetermined value of the average transmission energy as described above is stipulated by the Radio Law or the communication standard in each country. Hereinafter, it is assumed that the average transmission energy is the value thus stipulated as described above.

It is possible to obtain the average transmission energy by Sa/Ta and Sb/Tb. Therefore, in the examples as shown in FIG. 5A and FIG. 5B, it is desirable that a control is exercised under the relationship, Ta<Tb, Sa>Sb, Sa/Ta=Sb/Tb.

Figure 17:
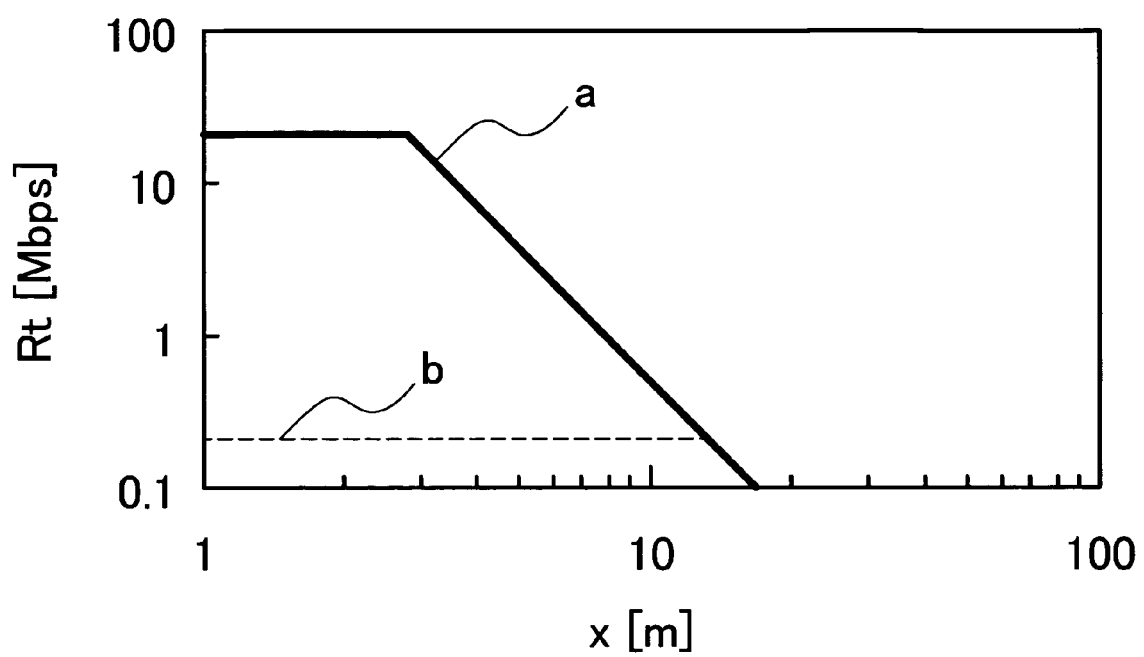
FIG. 17 is a chart showing an effect produced by the communications apparatus, when a control method according to the present invention has been applied.

FIG. 17 shows a simulation result comparing two cases, i.e., the control method of the present invention has been applied or not. Here, the control method of the present invention is to control a pulse train transmission rate and single pulse energy according to the communication environment, as explained in FIG. 5A and FIG. 5B. In FIG. 17, the vertical axis indicates the transmission rate Rt [Mbps] of the pulse train, and the horizontal axis indicates a communication distance x[m]. The solid line a represents a case where the control has been applied, and the dotted line b represents a case where the control has not been applied. In this simulation, under a condition where the control is not applied, information is transmitted by 64 pulses per one bit, and the average interval between pulses is 78 ns. On the other hand, under a condition where the control is applied, information is transmitted by 64 pulses per one bit, and the average interval between pulses is set to be variable between 7.8 ns to 156 ns.

As obvious from FIG. 17, when the control method of the present invention has been applied, the transmittable distance is improved. Within a short distance, that is, in the area where propagation environment is favorable, the transmission rate can be increased up to around over 10 Mbps, from around 0.2 Mbps that is the transmission rate when the control method is not applied. Therefore, by applying the control method of the present invention, it is possible to enhance a throughput for overall communications system.

Figure 6:
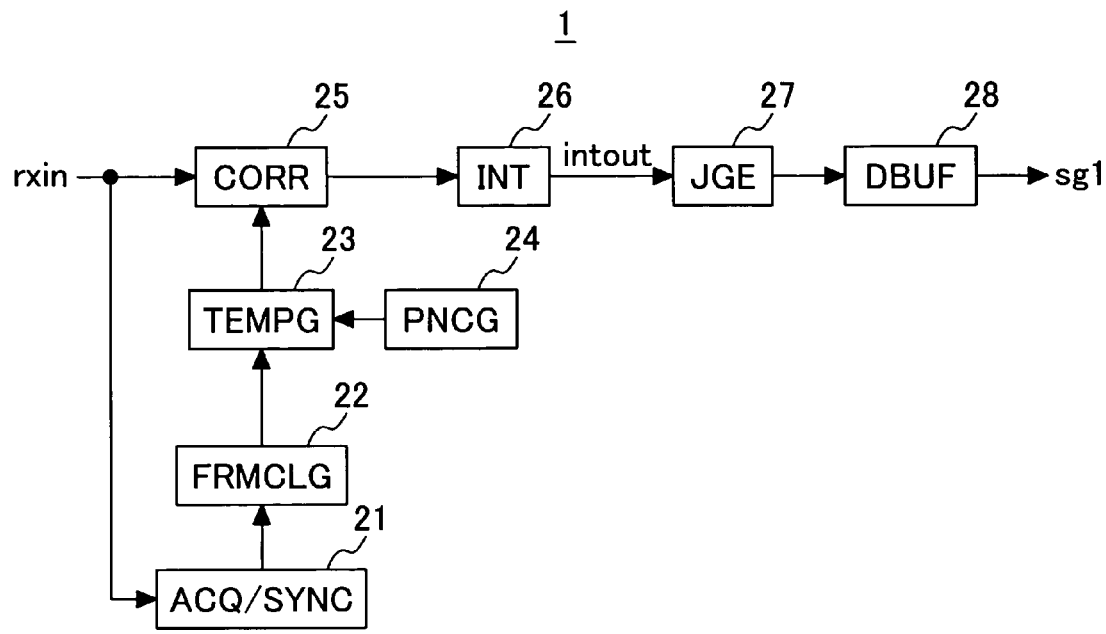
FIG. 6 is a block diagram showing a configuration of an example of the receiver (RCVR) as shown in FIG. 1.

FIG. 6 shows a configuration example of the receiver 1 as shown in FIG. 1. The receiver 1 comprises a signal acquisition/synchronization holding section (ACQ/SYNC) 21, a frame clock generator (FRMCLG) 22, a template waveform generator (TEMPG) 23, apseudo-random code generator (PNCG) 24, a correlator (CORR) 25, an integrator (INT) 26, a judging section (JGE) 27, and a data buffer (DBUF) 28.

The signal acquisition/synchronization holding section 21 detects a time when it is the most correlative between the received signal rxin and a referential waveform generated in the same slot that has been subjected to time hopping on the transmitter side. Subsequently, clock generation timing from the frame clock generator 22 is controlled so that the above correlation is maintained at a high level.

Based on the frame clock generated from the frame clock generator 22 and the time hopping sequence generated in the pseudo-random code generator 24, the time hopping sequence being the same as that on the transmitter side, a template waveform string is generated by the template waveform generator 23. This template waveform is multiplied by the received signal rxin in the correlator 25, and integrated by the integrator 26. The output intout from the integrator is determined whether it is positive or negative by the judging section 27, and it is temporarily accumulated in the data buffer 28. The judging timing by the judging section 27 is controlled by a control signal, not illustrated, from the signal acquisition/synchronization holding section 21.

Figure 7:
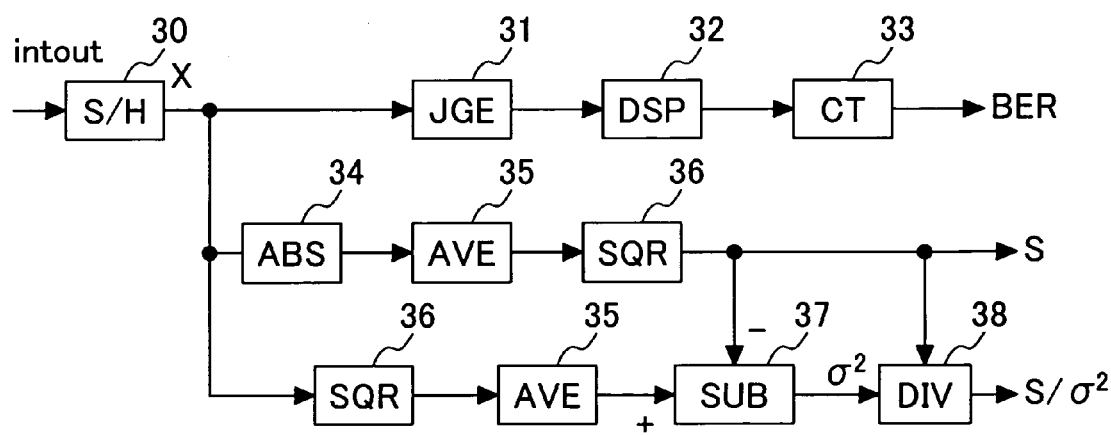
FIG. 7 is a block diagram showing a configuration of an example of the communication environment measuring section (MEAS) as shown in FIG. 2.

FIG. 7 is a block diagram showing a configuration example of the communication environment measuring section 2 as shown in FIG. 1. The communication environment measuring section 2 comprises a sample/hold section (S/H) 30, a judging section (JGE) 31, a signal processor (DSP) 32, a counter (CT) 33, an absolute value machine (ABS) 34, an averager (AVE) 35, a squarer (SQR) 36, a subtracter (SUB) 37, and a divider (DIV) 38. The absolute value machine 34 is a block which outputs an absolute value of the input X, |X|, and the averager 35 is a block which outputs a time average E(X).

Error rate measurement is possible when a received signal is provided with an error detection code. After the data is judged in the judging section 31, the signal processor 32 carries out decoding the error detection code which is given to the received signal so as to detect an error, and measures an error rate in the counter 33.

Measurements of a signal power S and a signal-to-noise ratio S/N are implemented by the following calculations. An integrated value intout which has been integrated by the integrator 26 as shown in FIG. 6 is subjected to sampling/holding in the sample/hold section 30, and a resulting output value is assumed as X. Then, the signal power S, dispersion $\sigma^2$, and the signal-to-noise ratio S/N are expressed by the following equations. Here, E(X) represents an averaged time of X.

$$S=(E(|X|))^2 \quad \text{(equation 1)}$$

$$\sigma^2=(E(X^2))-\{E(|X|)\}^2 \quad \text{(equation 2)}$$

$$S/N=S/\sigma^2 \quad \text{(equation 3)}$$

The measuring method is not limited to the one as indicated in FIG. 7. For example, it is also possible to assume that the received signal power is the integrator output intout itself, and the signal-to-noise ratio is assumed to be a square of the ratio between the intout and the absolute value of the integrator output at the time when there is no signal. Furthermore, in FIG. 7, the error rate measurement, signal power measurement, and signal-to-noise ratio measurement are included, but it is sufficient to be provided with at least one of the above measurements.

As for the background noise power, it may be calculated as a square of the absolute value of the integrator output at the time when there is no signal or the above dispersed value at the time when there is no signal, any of which man be employed.

Figure 8:
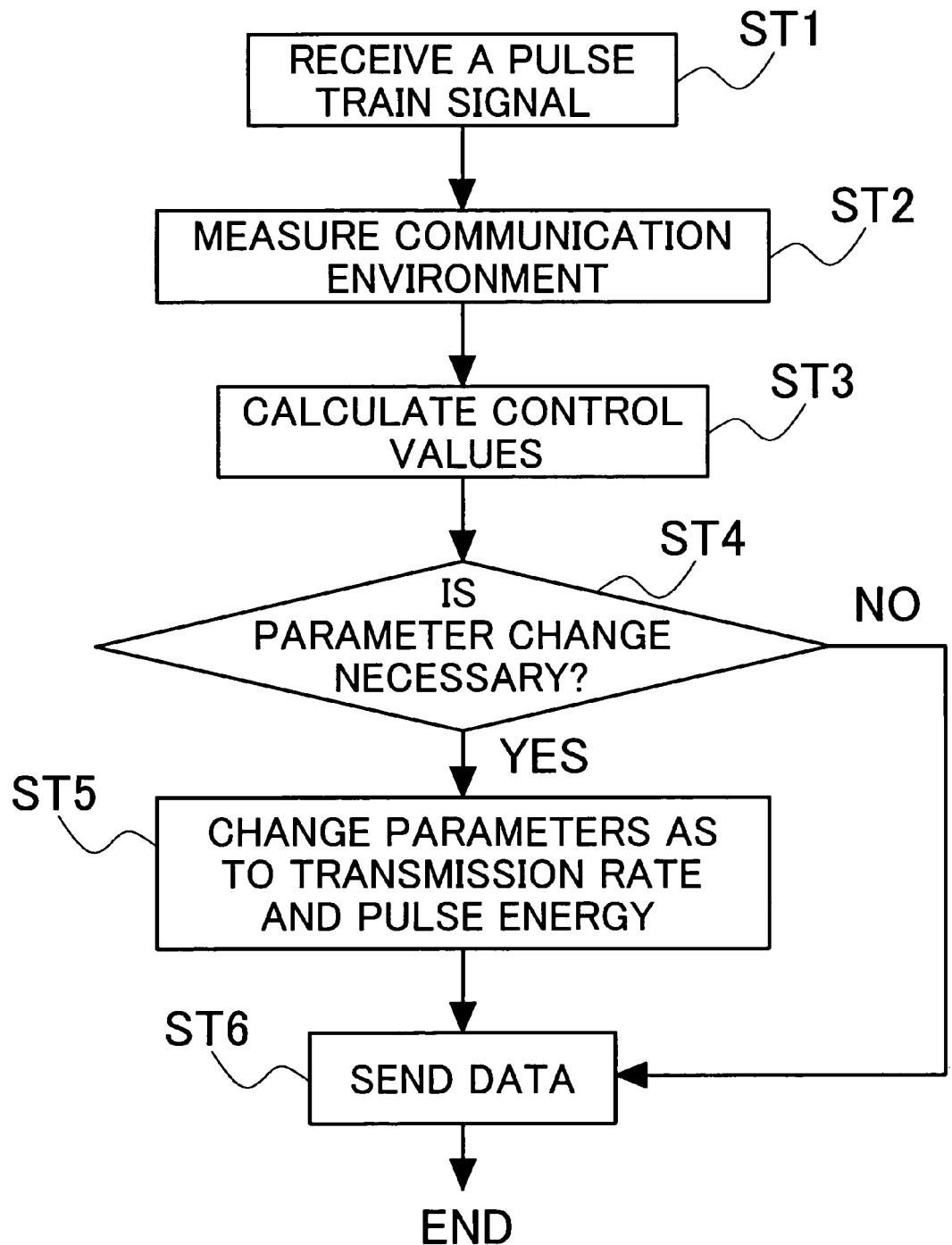
FIG. 8 is a flowchart showing the first control procedure in the communications apparatus according to the first embodiment.

FIG. 8 is a flowchart showing an example of a first control procedure. Firstly, the receiver 1 receives a pulse train (step ST1), and the communication environment measuring section 2 measures a property of the receiving (step ST2). A target of the communication environment measurement is at least one of followings: received power, signal-to-noise ratio, and error rate. Next, in step ST3, control values of transmission parameters (pulse train transmission rate and single pulse energy) are calculated, based on a result of the communication environment measurement, a transmission power of the received signal, and threshold values for measuring objects which are required for receiving operation. Next, the current transmission parameters are referred to for comparison (step ST4). As a result of the comparison, if it is necessary to change the parameters, the procedure goes to step ST5, and the transmission parameters are updated and transmission is carried out (step ST6). On the other hand, if a change of the parameters is not necessary, the procedure goes to step ST6, and transmission is carried out. Alternatively, it is possible to omit the step ST4, and carry out a control with transmission parameters which are calculated each time, without performing a comparison.

Figure 9:
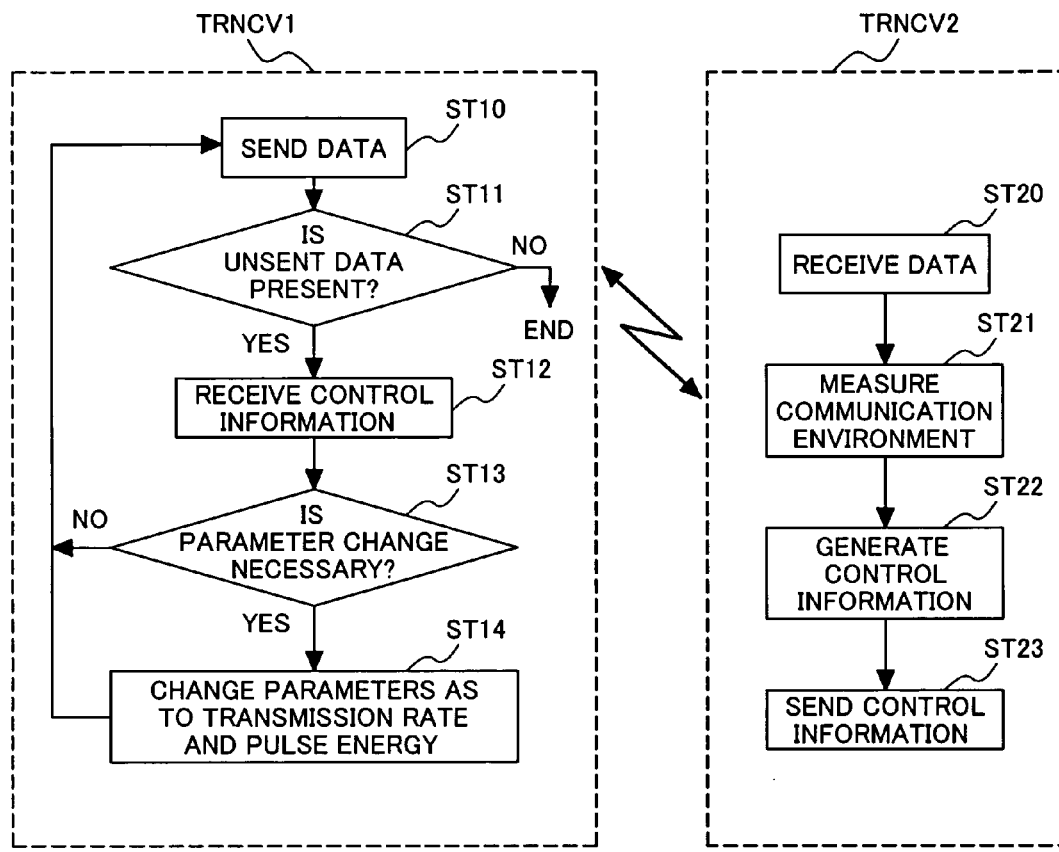
FIG. 9 is a flowchart showing the second control procedure in the communications apparatus according to the first embodiment.

FIG. 9 is a flowchart showing an example of the second control procedure in the communications apparatus according to the present embodiment. This figure indicates a communication procedure between two communications apparatuses, the communications apparatus TRNCV1 and the communications apparatus TRNCV2, each having a configuration as shown in FIG. 1.

When data is transmitted from the communications apparatus TRNCV1 to the communications apparatus TRNCV2, the receiver 1 of the communications apparatus TRNCV2 receives a pulse train including a predetermined transmission parameter transmitted from the communications apparatus TRNCV1 (step ST20). The communication environment measuring section 2 measures at least one of the received power, signal-to-noise ratio, and error rate as properties in receiving (step ST21), and generates control information according to the result thereof (step ST22). Subsequently, the communications apparatus TRNCV2 transmits the control information from the transmitter 3 to the communications apparatus TRNCV1 (step ST23).

In the communications apparatus TRNCV1, it is judged whether or not there exists transmission data which is to be transmitted, in the data buffer included in the transmitter 3 (step ST11). If it exists, the procedure goes to step ST12, and the receiver 1 receives a signal including the above control information from the communications apparatus TRNCV2, and in step ST13, the transmitter 3 judges whether or not a change of parameters is necessary based on the control information. If the change of parameters is necessary, the procedure goes to step ST14, and a control is carried out to change the parameters as to the pulse train transmission rate and the single pulse transmission energy, and then, the procedure goes to step ST10. If the change of parameters is not necessary, the procedure goes to step ST10 without changing the parameters, and transmission is carried out. The procedures as described above are repeated until no data to be transmitted remains any more in the data buffer of the transmitter 1.

Next, as a calculation example regarding the control values of the pulse train transmission rate and the single pulse transmission energy, a calculation method will be explained, which utilizes a result of received power measurement. The calculation method is not limited thereto. Here, it is assumed that Sr is a result of received power of a signal which has been transmitted with the single pulse energy St at a transmission rate Rt, and the received power ensuring a desired communications quality is Sh. In the case above, the control values are calculated as the following:

$$St'=K*St*(Sh/Sr) \quad \text{(equation 4)}$$

When predetermined average transmission energy is assumed as P, the transmission rate Rt' is:

$$Rt'=P/St' \quad \text{(equation 5)}$$

Here, St' and Rt' represent respectively, energy and transmission rate of a transmission pulse, after a control has been applied.

In the above equation 4, K represents a constant, and K is assumed to be equal to 1 when a received waveform for communication environment measurement and a transmission waveform for data transmission have identical propagation loss properties. If there is a difference in propagation loss properties between those waveforms, K is associated with this difference. For example, if it is possible to expect in advance that the propagation loss of the measurement waveform per unit distance is Lr, and the propagation loss of the transmission waveform per unit distance is Lt, it is possible to define that K=Lt/Lr. The constant K may be used in the following equations as well, with a similar definition. As described above, controlling is possible even if properties are different between the waveform for measurement and the waveform for transmission.

Next, a calculation example will be explained, where the signal-to-noise ratio is used for the above communication environment measurement. Here, it is assumed that the signal-to-noise ratio of the signal, which has been transmitted with the single pulse energy St at a transmission rate Rt, is SNRr, and a received power that ensures a predetermined communications quality if SNRh. At this timing, the control value St' is calculated by the following equation and Rt' is calculated by the above equation 5:

$$St'=K*St*(SNRh/SNRr) \quad \text{(equation 6)}$$

Next, a calculation example will be explained, where the error rate is used for the above communication environment measurement. Generally, a relationship between the error rate and the signal-to-noise ratio indicates a function depending on a modulation method. A predicted value of the signal-to-noise ratio SNRr which has been received is obtained by a function depending on the modulation method, based on the error rate thus measured, and by use of SNRr' thus calculated, substituting SNRr' into SNRr of the above equation 6, and a control value St' is obtained, and then the control value Rt' is obtained by the aforementioned equation 5.

Next, a calculation example will be explained, where the background noise power is used for the above communication environment measurement. This is effective in the case where the communication is less affected by deterioration due to a multi-path propagation, such as a communication within an indoor close range, and also there is a variation in electromagnetic environment such as a background noise. When it is assumed that the background noise power by measurement is Pn, the signal-to-noise ratio required for receiving is SNRh, and the signal power loss under an expected environment is L, the control value St' is calculated by the following equation, and the control value Rt' is obtained by the above equation 5:

$$St'=SNRh*Pn*L \quad \text{(equation 7)}$$

Calculation of the above transmission parameters may be carried out actually on the communications apparatus. Alternatively, the calculation may be carried out by preparing in advance a table to be referred to, in the control signal generator.

Figure 10:
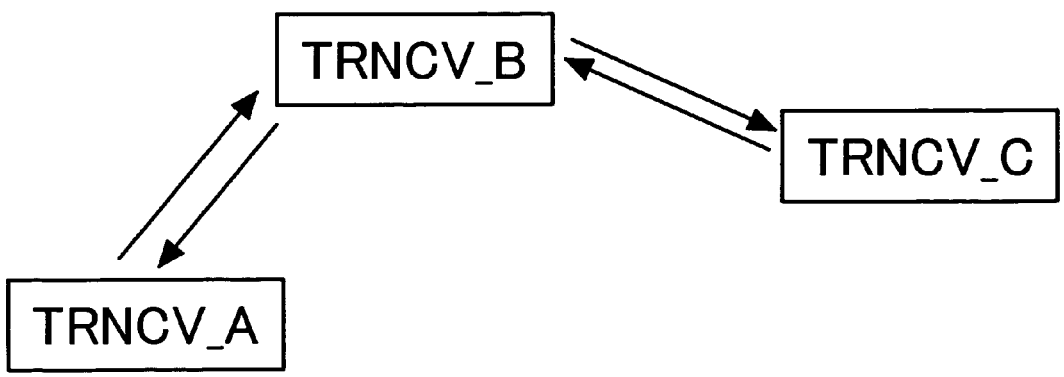
FIG. 10 is a block diagram showing a multi-hop network, as an example to which the communications apparatus according to the first embodiment is applied.

The control methods as shown in FIG. 8 and FIG. 9 may be applied to one-to-one communication, or they may also be applied to a network having a multi-hop topology as shown in FIG. 10. TRNCV_A, TRNCV_B and TRNCV_C as shown in FIG. 10 are communications apparatuses each having the configuration of the present embodiment.

In the description above regarding the present embodiment, the receiver 1 in the communications apparatus as shown in FIG. 1 is explained as a block to receive a pulse train. In addition, it may be a block which receives other than the above pulse train. In this case, the transmitter controls the pulse train transmission rate and the single pulse energy, according to a measurement result as to the received properties of the signal in the communication environment measuring section 2, and transmits the pulse train. Furthermore, the transmitter may control the pulse train transmission rate and the single pulse energy according to the control information received by the receiver 1, and transmits the pulse train.

Second Embodiment

Figure 11:
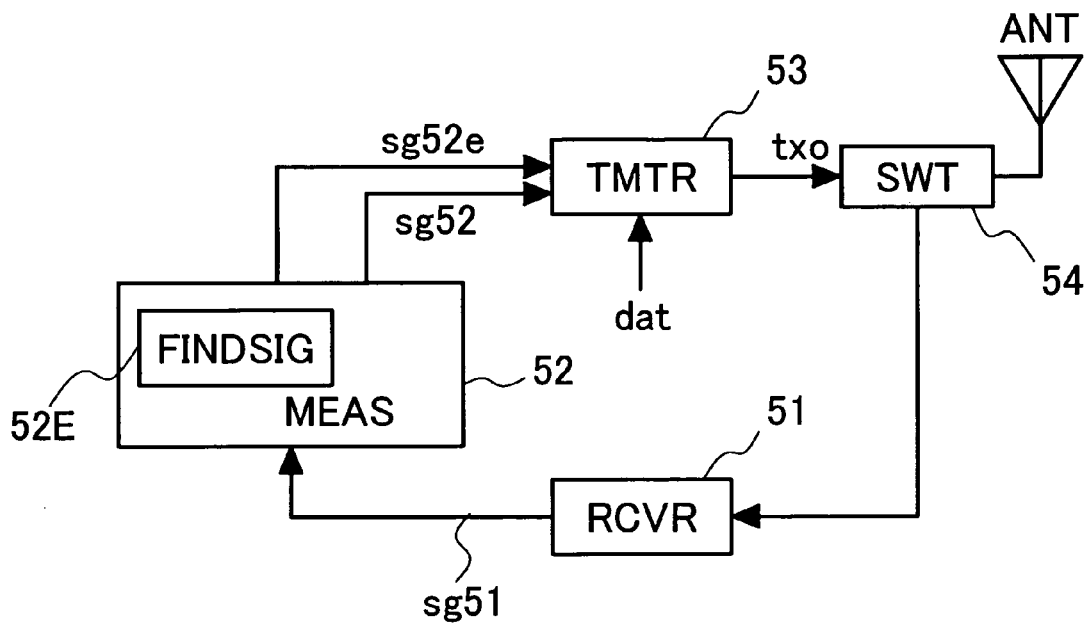
FIG. 11 is a block diagram showing a configuration of an example in which the present invention is applied to a communications apparatus according to the second embodiment.

FIG. 11 shows a configuration of a communications apparatus according to the second embodiment of the present invention. The communications apparatus according to the present embodiment comprises a receiver (RCVR) 51 which receives a predetermined signal via the antenna1 ANT, a communication environment measuring section (MEAS) 52 which measures a communication environment status according to an output signal sg51 from the receiver, a transmitter (TMTR) 53 which receives a measurement result sg52 from the communication environment measuring section, controls a transmission rate of the transmission pulse train and energy of a single pulse of data dat to be transmitted and carries out transmission, and a switch (SWT) 54 which allows the receiver 51 and the transmitter 53 to share the antenna. The present embodiment is different from the first embodiment, in the points that the communication environment measuring section 52 includes a signal detector (FINDSG) 52E, and the transmitter 53 has a control function to control a transmission start timing to transmit a pulse train which has been controlled to have a predetermined transmission rate and a single pulse energy, upon receipt of a detected signal sg52e from the signal detector 52E, in addition to the features similar to those of the transmitter 1 of FIG. 1.

The predetermined signal received in the above receiver is not limited to a pulse signal, and a signal for any type of communication means, such as analogue signal, may be applicable.

The signal detector 52E has a function to detect whether the above predetermined signal exits or not, and according to the detected signal sg52e, the transmitter 53 controls the pulse train to have the transmission rate and the single pulse energy as predetermined, and then transmits the pulse train thus controlled. Alternatively, it is a matter of course that the pulse train transmission rate and the single pulse energy may be controlled according to the measurement result sg52 from the signal power measuring section or from the signal-to-noise ratio measuring section in the communication environment measuring section 52, and then transmission of the pulse train is carried out.

For example, when it is detected that the predetermined signal is transmitted, it triggers starting of data transmission, by use of the pulse train which has been controlled to have a predetermined pulse train transmission rate and single pulse energy, and starts the data transmission. With the configuration above, the transmission from external equipment can be controlled and electric power consumption can be reduced.

Figure 12:
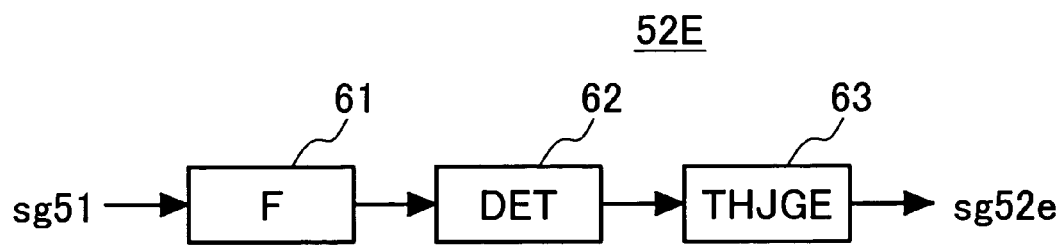
FIG. 12 is a block diagram showing a configuration of an example of a signal detector as shown in FIG. 11.

FIG. 12 is a block diagram showing a configuration example of the signal detector 52E. The signal detector 52E comprises a filter (F) 61 having a predetermined frequency band, a detector (DET) 62, and a threshold judging section (THJG) 63. When a detected output, which is detected by the detector 62, goes beyond a predetermined threshold in the threshold judging section 63, it is determined that there exists a predetermined signal, and a detected signal sg52e is outputted.

Figure 13:
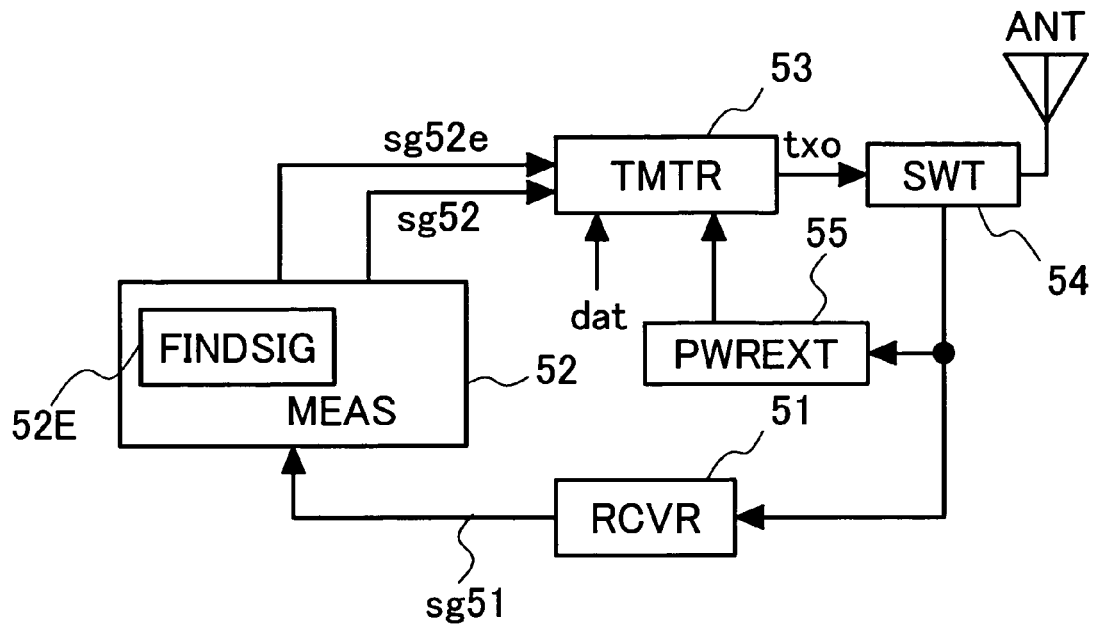
FIG. 13 is a block diagram showing another configuration of an example in which the present invention is applied to a communications apparatus according to the second embodiment.

FIG. 13 shows another configuration example of the communications apparatus according to the present embodiment. This communications apparatus is configured such that a power extractor (PWREXT) 55 is added to the configuration of FIG. 11. The power extractor 55 is capable of extracting power from a signal being received, and supplying thus extracted power to the transmitter 53. The transmitter 53 transmits a pulse train utilizing this power. Accordingly, power supply for transmitting the pulse train is available from the outside, and thus the communications apparatus according to the present embodiment becomes applicable for another usage, such as radio frequency type identification tag (RF-ID tag) and non-contact type IC card. The power extractor 55 may also be provided with a function to hold the power. In that case, it is possible to add to the communications apparatus a function which allows a pulse train to be transmitted as required by use of the power thus held.

Third Embodiment

Figure 14:
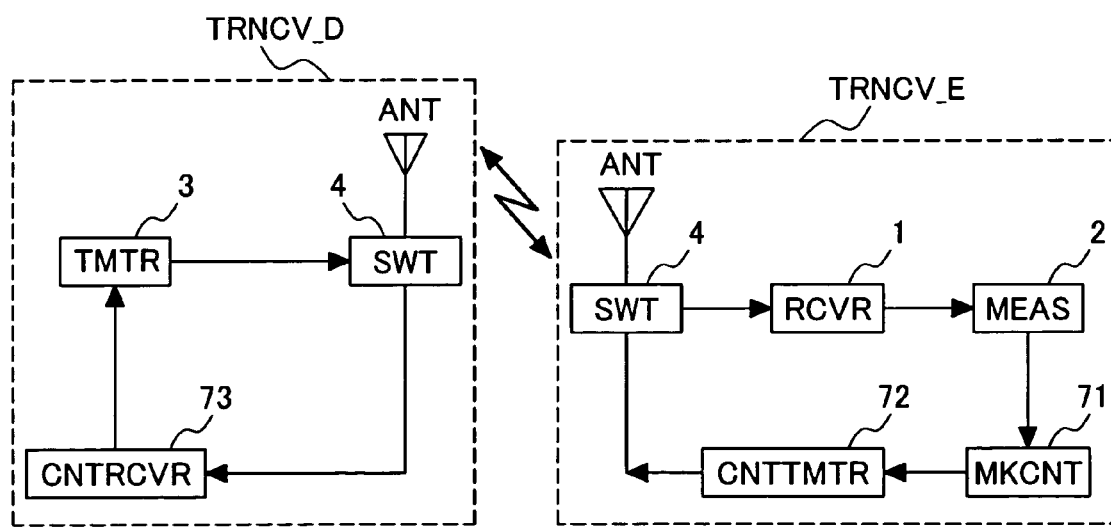
FIG. 14 is a diagram showing a configuration of an example of a communications system according to the third embodiment.

FIG. 14 is a diagram showing a configuration example of the communications system according to the third embodiment of the present invention. The communications system according to the present embodiment is a system to receive data transmitted from the communications apparatus TRNCV_D by the communications apparatus TRNCV_E. In FIG. 14, the reference numeral 1 denotes a receiver (RCVR), numeral 2 denotes a communication environment measuring section (MEAS), numeral 3 denotes a transmitter (TMTR), numeral 4 denotes a switch (SWT), numeral 71 denotes a control information generator (MKCNT), numeral 72 denotes a control information transmitter (CNTTMTR), and numeral 73 denotes a control information receiver (CN-TRCVR).

In the configuration as shown in FIG. 14, the receiver 1 and the communication environment measuring section 2 of the communications apparatus TRNCV_E have functions similar to those of the receiver and the communication environment measuring section of FIG. 1, respectively. That is, the receiver 1 is a block which receives a pulse train, and the communication environment measuring section 2 is a block which measures at least one of the received power, signal-to-noise ratio, error rate and background noise power as to the signal received by the receiver 1. Furthermore, the control signal generator 71 generates a control signal according to a result of the measurement in the communication environment measuring section 2. This control signal is transmitted by a predetermined communication means from the control information transmitter 72. This communication means is not limited to a pulse signal, and any type of signal, such as analogue signal, may be applicable.

In the communications apparatus TRNCV_D, the transmitter 3 has functions similar to those of the transmitter as shown in FIG. 1. The control information receiver 73 is a block which receives control information, transmitted by the control information transmitter 72 in the communications apparatus TRNCV_E. The transmitter 3 performs a control of the pulse train transmission rate and the single pulse transmission energy based on the control information received by the control information receiver 73, and transmits the pulse train thus controlled.

An example of the control procedure according to the present embodiment follows the same flowchart as shown in FIG. 9. The communications apparatus TRNCV1 in FIG. 9 corresponds to the communications apparatus TRNCV_D in FIG. 14 and the communications apparatus TRNCV2 in FIG. 9 corresponds to the communications apparatus TRNCV_E in FIG. 14.

When data is transmitted from the communications apparatus TRNCV_D to the communications apparatus TRNCV_E, the communications apparatus TRNCV E receives at the receiver 1 the pulse train having predetermined transmission parameters transmitted from the communications apparatus TRNCV_D. The communication environment measuring section 2 carries out the communication environment measurement based on the received waveform, and the control information generator 71 generates control information according to the result, and then the control information transmitter 72 transmits thus generated control information.

In the communications apparatus TRNCV_D, it is determined whether or not there exists data to be transmitted to the data buffer (which corresponds to the data buffer 14 of FIG. 3) being included in the transmitter 3. If transmission data exists, the control information receiver 73 receives the control information from the communications apparatus TRNCV_E, and based on the control information, the transmitter 3 controls the pulse train transmission rate and the single pulse transmission energy, and transmits thus controlled pulse train. The procedures above are repeated until no data to be transmitted remains any more in the data buffer within the control information transmitter 72.

According to the present embodiment, it is possible to simplify or even omit the receiver and communication environment measuring section, in a communications apparatus which transmits data by use of a pulse train. Therefore, it is also possible to fulfill a requirement for simplifying a node configuration in a star network, for example. As shown in FIG. 14, the communications apparatus TRNCV_E serves as a base station, the communications apparatus TRNCV_D servers as a node, and communications can be carried out, via a communication method which has a favorable transmission efficiency by use of a pulse train from the node to the base station, and via a communication method having small load on the node from the base station to the node, thereby improving overall system efficiency.

Fourth Embodiment

Figure 15:
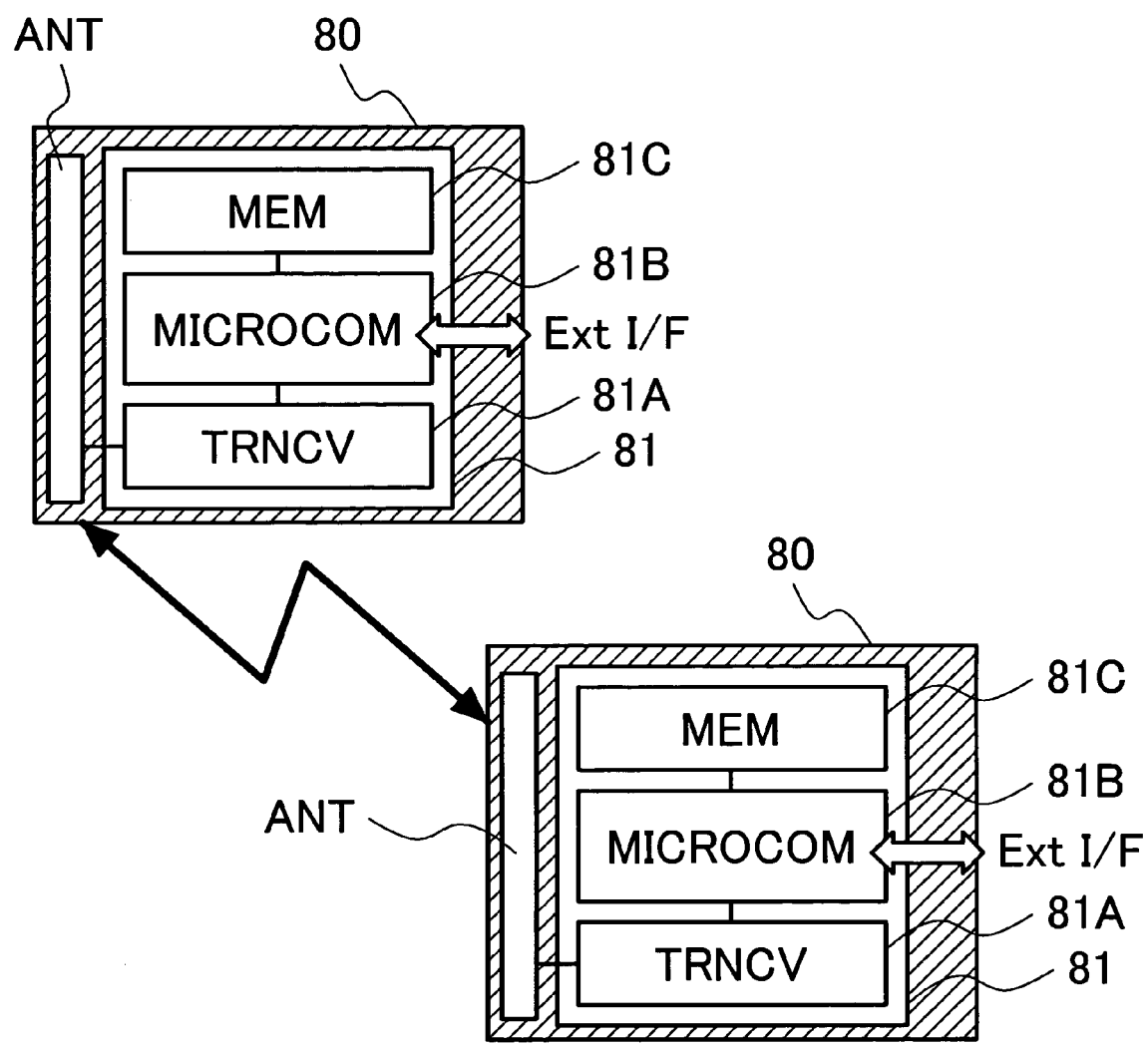
FIG. 15 is a diagram showing one example application of the communications apparatus according to the present invention.

FIG. 15 is a diagram showing an example application of the communications apparatus according to the present invention. The apparatus 80 according to the present embodiment comprises a module 81 which includes a communications apparatus (TRNCV) 81A, a microcomputer (MICROCOM) 81B, and a memory (MEM) 81C. The module 81 can be implemented by one and the same chip or a combination of multiple chips.

The communications apparatus 81A is coupled with the antenna ANT. Here, the communications apparatus 81A is an apparatus relating to the present invention, and any one of the communications apparatuses as described in the above Examples 1 to 3 can be applied. The microcomputer 81B carries out processing of data stored in the memory 81C, receives data obtained from the outside, processes the data as required, and stores the processed data in the memory. The microcomputer 81B further processes appropriately the data stored in the memory 81C, and data obtained from the outside via an external interface Ext I/F, and sends the processed data to the communications apparatus 81A. The communications apparatus 81A transmits the data sent from the microcomputer 81C by use of a pulse train, and receives a signal from the antenna. Furthermore, the microcomputer 81B performs a control of the communications apparatus 81A as required. With this configuration, it is possible to allow the microcomputer 81B to perform all the controls to implement the communication method relating to the present invention.

Fifth Embodiment

Figure 16:
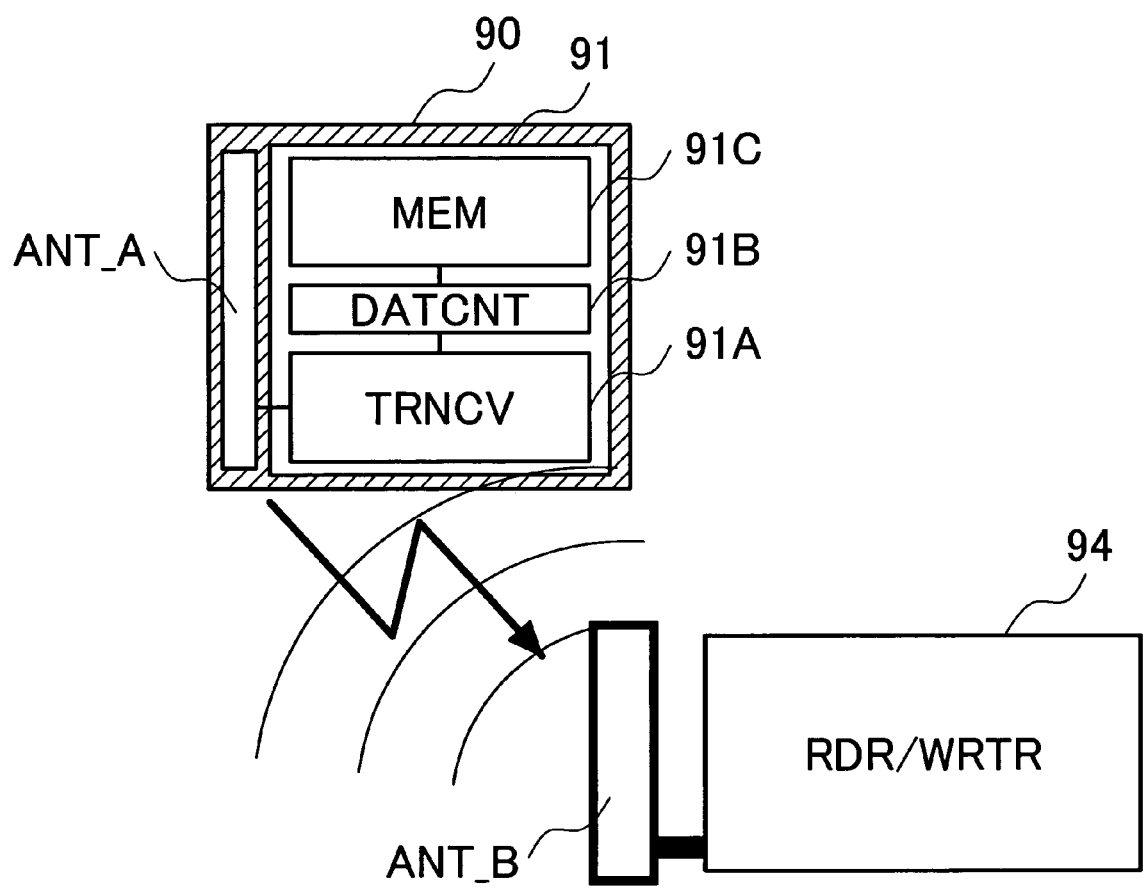
FIG. 16 is a diagram showing another example application of the communications apparatus according to the present invention.

FIG. 16 is a diagram showing another example application of the communications apparatus according to the present invention. Equipment 90 in the present embodiment includes a communications apparatus, and it is assumed to be a non-contact type IC card, RF-ID tag, and the like. The equipment 90 is provided with a module 91 including a communications apparatus (TRNCV) 91A, a data controller (DATCNT) 91B, a memory 91C and an antenna (ANT_A). The module 91 is implemented by one and the same chip or a combination of multiple chips. Furthermore, a reader/writer unit (RDR/WRTR) 94 is connected to the antenna (ANT_B).

Here, the communications apparatus 91A is an apparatus relating to the present invention, and a case where the communications apparatus having a configuration as shown in FIG. 13 of Second embodiment is applied will be explained as a way of example.

The reader/writer unit 94 transmits a predetermined signal. The communications apparatus 91A detects the predetermined signal via the antenna ANT_A. The communications apparatus 91A uses the detection of the predetermined signal from the reader/writer unit 94 as a trigger, reads data from the memory 91C via the data controller 91B, and then transmits data by use of the pulse train. The reader/writer unit 94 receives the pulse train via the antenna ANT_B and reads the data within the memory 91C.

It is further possible to include predetermined information in the predetermined signal from the reader/writer unit 94. In that case, the communications apparatus 91A receives the signal, obtains predetermined information, and then stores the above information into the memory 91C via the data controller 91B.

It is further possible to provide a power extraction/holding section within the communications apparatus 91A, to extract power from the signal of the reader/writer unit, holds the power as required, and uses the power for transmitting the above pulse train, reading from the memory, and writing into the memory. Accordingly, electric power for necessary operations can be supplied from the reader/writer unit 94, and low power consumption in the equipment 90 can be achieved, or eliminating the use of built-in butteries and ensuring a non-battery system.

The communications apparatus 91A of the present embodiment has been explained with an example application of the communications apparatus as described in Second embodiment, but the communications apparatus of First embodiment or Third embodiment may be applicable as well.

What is claimed is:

1. A communications apparatus which carries out information transmission by use of a pulse train, comprising:
   a receiver which receives a predetermined signal;
   a communication environment measuring means which measures a communication environment status based on the signal received by said receiver; and
   a transmitter having a controller which performs transmission rate control of said pulse train and transmission energy control of each single pulse in association with each other, based on a result of measurement with said communication environment measuring unit,
   wherein:
   when a value indicating the communication environment status is favorable is measured, said controller increases the transmission rate of said pulse train and decreases transmission energy of each single pulse so as to keep an average of transmission energy equal to or less than a predetermined average value; and
   when a value indicating the communication environment status is unfavorable is measured, said controller decreases the transmission rate of said pulse train and increases transmission energy of each single pulse so as to keep the average of the transmission energy equal to or less than the predetermined average value,
   wherein said transmitter transmits said pulse train which has been controlled by said controller,
   wherein the control values of the pulse train transmission rate and the transmission energy of each single pulse are calculated by utilizing a result of received power measurement in compliance with equations:

$$St' = K*St*(Sh/Sr), \text{ and}$$

$$Rt' = P/St',$$

where P represents predetermined average transmission energy, Sr represents a result of received power of a signal which has been transmitted with the transmission energy of each single pulse St at a transmission rate Rt, Sh represents the received power ensuring a desired communications quality, St' represents energy of a transmission pulse after the control has been applied, Rt' represents transmission rate of a transmission pulse after the control has been applied, and K represents a constant,
   wherein K is equal to 1 when a received waveform for communication environment measurement and a transmission waveform for data transmission have identical propagation loss properties,
   wherein if there is a difference in propagation loss properties between those waveforms, then K is associated with this difference, and
   wherein if the propagation loss of the measurement waveform per unit distance is Lr, and the propagation loss of the transmission waveform per unit distance is Lt, then define that K=Lt/Lr.

2. The communications apparatus according to claim 1, wherein said communication environment status to be measured is at least one of the followings as to said received a signal: a status of signal power; a status of a signal-to-noise ratio; a status of an error rate of received data; and a status of background noise power.

3. The communications apparatus according to claim 1, wherein said transmitter carries out transmission of said pulse train having controlled by said controller, which started controlling in response to a predetermined control signal which has been received.

4. The communications apparatus according to claim 1, wherein said communication environment measuring unit includes a detecting unit for detecting a predetermined signal, and said transmitter starts transmitting said pulse train having been controlled by said controller, according to a result of detection with said detecting unit.

5. The communications apparatus according to claim 1, wherein:
   when the value indicating the communication environment status is favorable is measured, said controller narrows a pulse interval between said pulse trains and decreases an amplitude of each single pulse so as to keep the average of transmission energy equal to or less than the predetermined average value; and
   when the value indicating the communication environment status is unfavorable is measured, said controller widens a pulse interval between said pulse trains and increases an amplitude of each single pulse so as to keep the average of transmission energy equal to or less than the predetermined average value.

6. A communications system comprising a first communications apparatus and at least one second communications apparatus, and carrying out communications through transmitting and receiving a pulse train,
   wherein said first communications apparatus includes:
   a first receiver which receives said pulse train;

a communication environment measuring unit which measures a communication environment status based on the signal received by said first receiver;

a control signal generator which generates a control signal based on a result of measurement with said communication environment measuring unit; and a first transmitter which transmits said control signal to said second communications apparatus, wherein said second communications apparatus includes:

a second receiver which receives said control signal transmitted from said first communications apparatus; and a second transmitter which is provided with a controller which performs transmission rate control of said pulse train and transmission energy control of each single pulse in association with each other according to said control signal received by said second receiver, wherein:

when a value indicating the communication environment status is favorable is measured, said controller increases the transmission rate of said pulse train and decreases transmission energy of each single pulse so as to keep an average of transmission energy equal to or less than a predetermined average value; and when a value indicating the communication environment status is unfavorable is measured, said controller decreases the transmission rate of said pulse train and increases transmission energy of each single pulse so as to keep the average of the transmission energy equal to or less than the predetermined average value, wherein said second transmitter transmits said pulse train having been controlled by said controller to said first communications apparatus, wherein the control values of the pulse train transmission rate and the transmission energy of each single pulse are calculated by utilizing a result of received power measurement in compliance with equations:

$$St'=K*St*(Sh/Sr), \text{ and}$$

$$Rt'=P/St',$$

where P represents predetermined average transmission energy, Sr represents a result of received power of a signal which has been transmitted with the transmission energy of each single pulse St at a transmission rate Rt, .Sh represents the received power ensuring a desired communications quality, St' represents energy of a transmission pulse after the control has been applied, Rt' represents transmission rate of a transmission pulse after the control has been applied, and K represents a constant, wherein K is equal to 1 when a received waveform for communication environment measurement and a transmission waveform for data transmission have identical propagation loss properties, wherein if there is a difference in propagation loss properties between those waveforms, then K is associated with this difference, and wherein if the propagation loss of the measurement waveform per unit distance is Lr, and the propagation loss of the transmission waveform per unit distance is Lt, then define that K=Lt/Lr.

7. The communications system according to claim 6, wherein:

when the value indicating the communication environment status is favorable is measured, said controller narrows a pulse interval between said pulse trains and decreases an amplitude of each single pulse so as to keep the average of transmission energy equal to less than the predetermined average value; and when the value indicating the communication environment status is unfavorable is measured, said controller widens said pulse interval between said pulse trains and increases an amplitude of each single pulse so as to keep the average of transmission energy equal to or less than the predetermined average value.

8. A communications method which carries out transmitting and receiving by use of a pulse train, comprising the steps of:

receiving a predetermined signal;

measuring a communication environment based on said predetermined signal received in said receiving step;

controlling transmission rate of said pulse train and transmission energy of each single pulse in association with each other according to a result of measurement in said measuring step; and transmitting said pulse train which has been controlled, wherein:

when a value indicating the communication environment status is favorable is measured, increasing the transmission rate of said pulse train and decreasing transmission energy of each single pulse so as to keep an average of transmission energy equal to or less than a predetermined average value; and when a value indicating the communication environment status is unfavorable is measured, decreasing the transmission rate of said pulse train and increasing transmission energy of each single pulse so as to keep the average of the transmission energy equal or less than the predetermined average value, wherein the control values of the pulse train transmission rate and the transmission energy of each single pulse are calculated by utilizing a result of received power measurement in compliance with equations:

$$St'=K*St*(Sh/Sr), \text{ and}$$

$$Rt'=P/St',$$

where P represents predetermined average transmission energy, Sr represents a result of received power of a signal which has been transmitted with the transmission energy of each single pulse St at a transmission rate Rt, Sh represents the received power ensuring a desired communications quality, St' represents energy of a transmission pulse after the control has been applied, Rt' represents transmission rate of a transmission pulse after the control has been applied, and K represents a constant, wherein K is equal to 1 when a received waveform for communication environment measurement and a transmission waveform for data transmission have identical propagation loss properties, wherein if there is a difference in propagation loss properties between those waveforms, then K is associated with this difference, and wherein if the propagation loss of the measurement waveform per unit distance is Lr, and the propagation loss of the transmission waveform per unit distance is Lt, then define that K=Lt/Lr.

9. The communications method according to claim 8, wherein:

when the value indicating the communication environment status is favorable is measured, narrowing a pulse interval between said pulse trains and decreasing an amplitude of each single pulse so as to keep the average of transmission energy equal to or less than the predetermined average value; and when the value indicating the communication environment status is unfavorable is measured, widens said pulse interval between said pulse trains and increasing an amplitude of each single pulse so as to keep the average of transmission energy equal to or less than the predetermined average value.

10. A communications method performed by a first communications apparatus and at least one second communications apparatus, and carrying out communications through transmitting and receiving a pulse train, the method comprising:

a first receiving step of receiving a predetermined signal with the first communication apparatus;

a measuring step of measuring a communication environment based on said signal thus received with the first communication apparatus, a control signal generating step of generating a control signal based on a result of measurement in said measuring step;

a first transmission step of transmitting said control signal to said second communications apparatus with the first communication apparatus;

a second receiving step of receiving said control signal transmitted from said first communications apparatus with the second communication apparatus;

a control step of performing transmission rate control of said pulse train and transmission energy control of each single pulse in association with each other according to said control signal received in said second receiving step with the second communication apparatus; and a second transmitting step of transmitting said pulse train having been controlled in said control step to said first communications apparatus with the second communication apparatus, wherein:

when a value indicating the communication environment status is favorable is measured, increasing the transmission rate of said pulse train and decreasing transmission energy of each single pulse so as to keep an average of transmission energy equal to or less than a predetermined average value; and when a value indicating the communication environment status is unfavorable is measured, decreasing the transmission rate of said pulse train and increasing transmission energy of each single pulse so as to keep the average of the transmission energy equal to or less than the predetermined average value, wherein the control values of the pulse train transmission rate and the transmission energy of each single pulse are calculated by utilizing a result of received power measurement in compliance with equations:

$$St' = K*St*(Sh/Sr), \text{ and}$$

$$Rt' = P/St',$$

where P represents predetermined average transmission energy, Sr represents a result of received power of a signal which has been transmitted with the transmission energy of each single pulse St at a transmission rate Rt, Sh represents the received power ensuring a desired communications quality, St' represents energy of a transmission pulse after the control has been applied, Rt' represents transmission rate of a transmission pulse after the control has been applied, and K represents a constant, wherein K is equal to 1 when a received waveform for communication environment measurement and a transmission waveform for data transmission have identical propagation loss properties, wherein if there is a difference in propagation loss properties between those waveforms, then K is associated with this difference, and wherein if the propagation loss of the measurement waveform per unit distance is Lr, and the propagation loss of the transmission waveform per unit distance is Lt, then define that K=Lt/Lr.

11. The communications method according to claim 10, wherein:

when the value indicating the communication environment status is favorable is measured, narrowing a pulse interval between said pulse trains and decreasing an amplitude of each single pulse so as to keep the average of transmission energy equal to or less than the predetermined average value; and when the value indicating the communication environment status is unfavorable is measured, widening a pulse interval between said pulse trains and increasing an amplitude of each single pulse so as to keep the average of transmission energy equal to or less than the predetermined average value.

* * * * *